Aug. 16, 1960 P. BOGNER 2,949,087
APPARATUS FOR MAKING CANS
Filed Nov. 12, 1953 13 Sheets-Sheet 1

INVENTOR.
BY Peter Bogner
Olson & Trexler
attys.

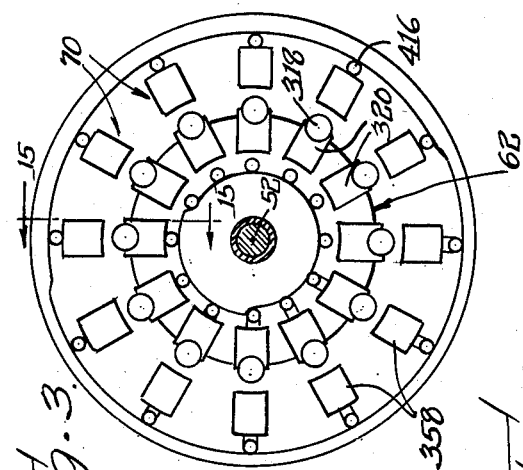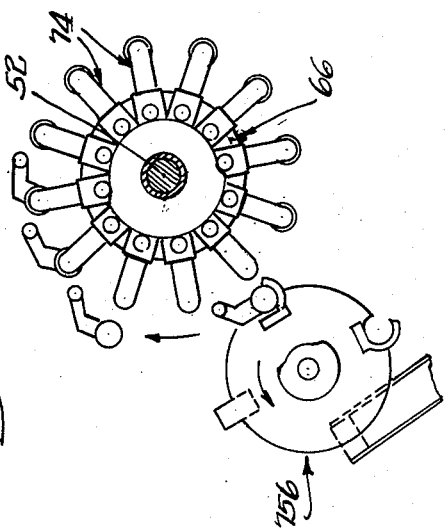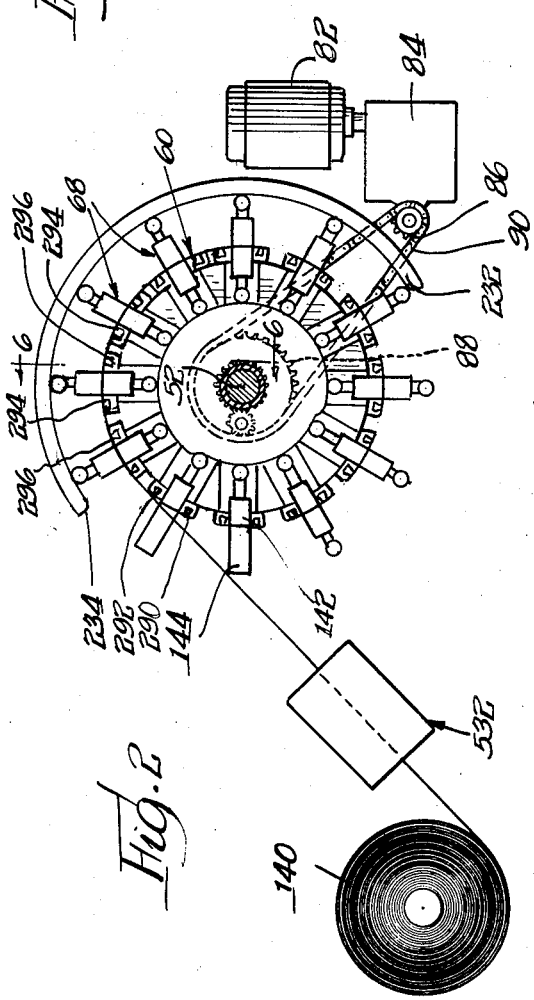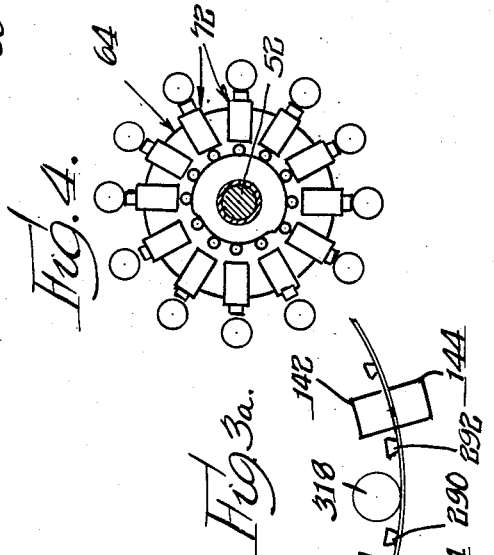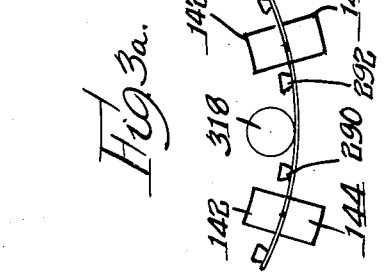

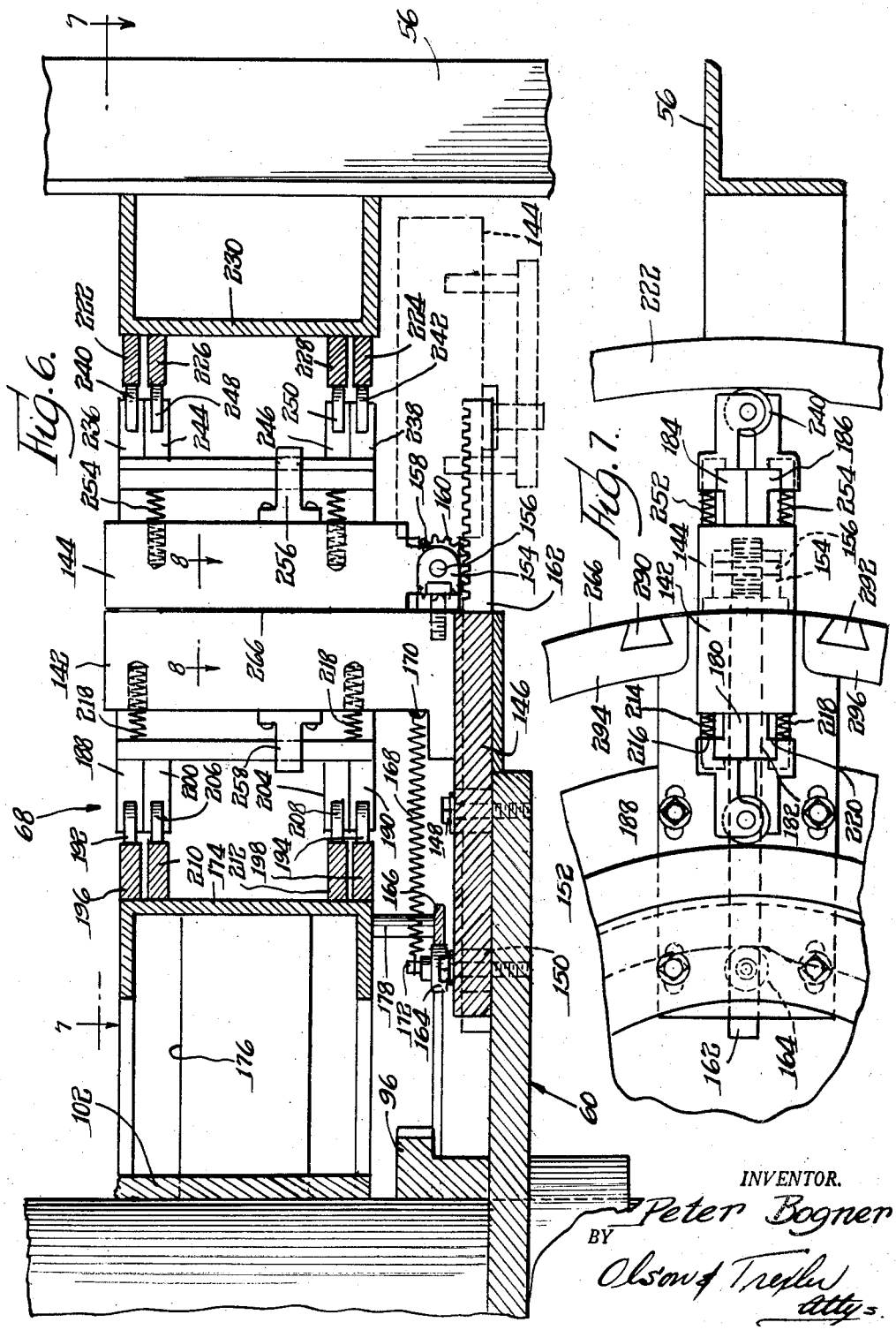

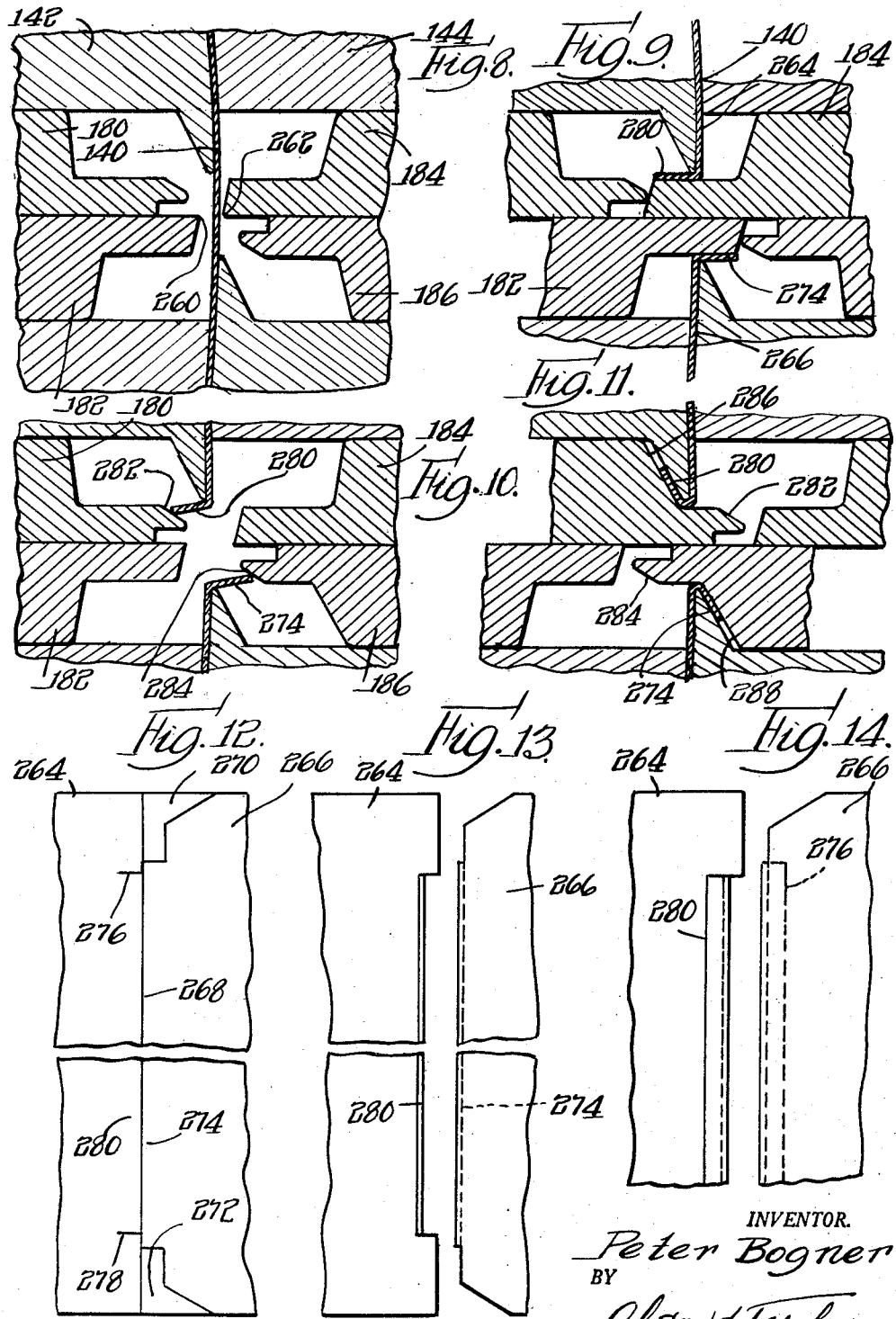

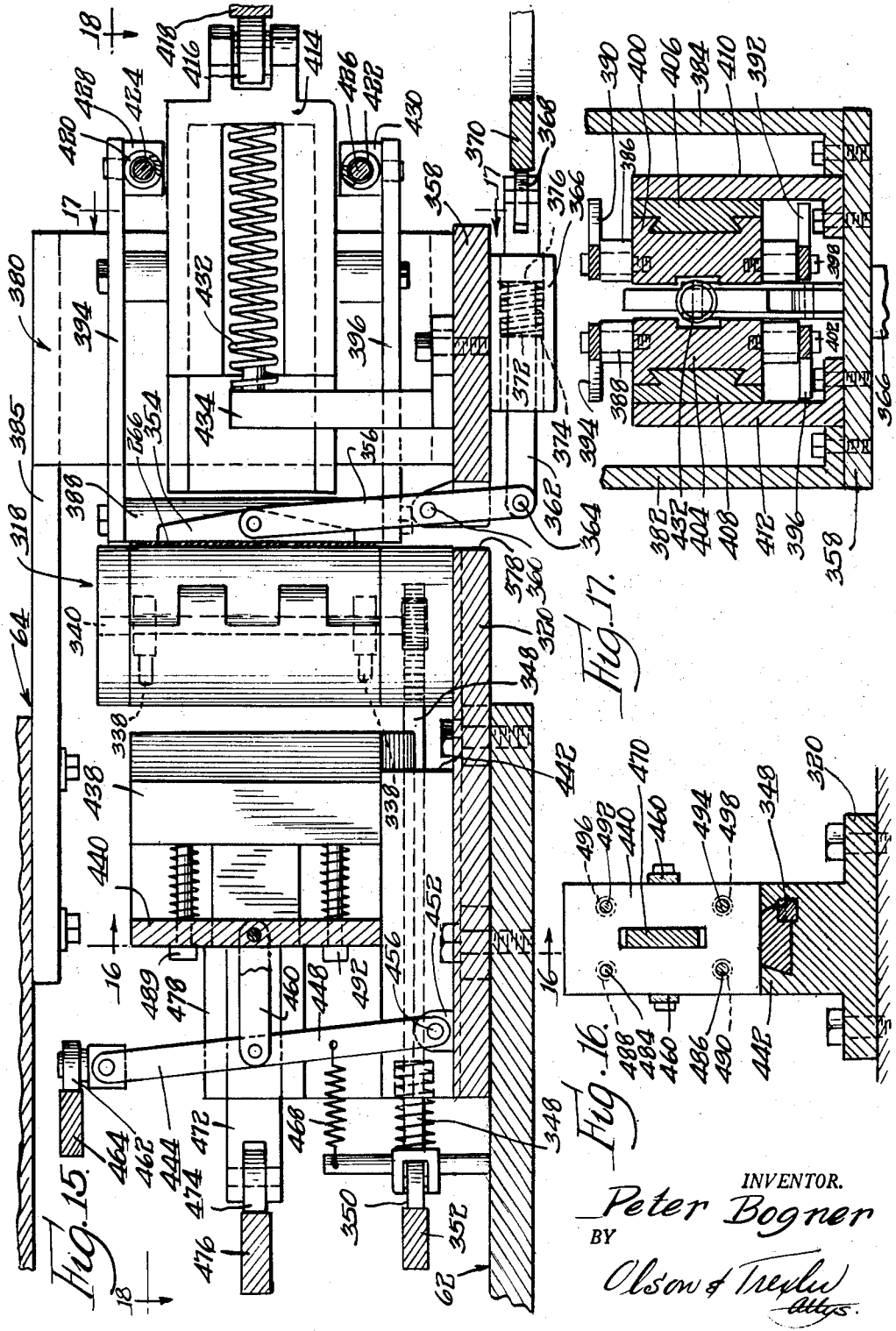

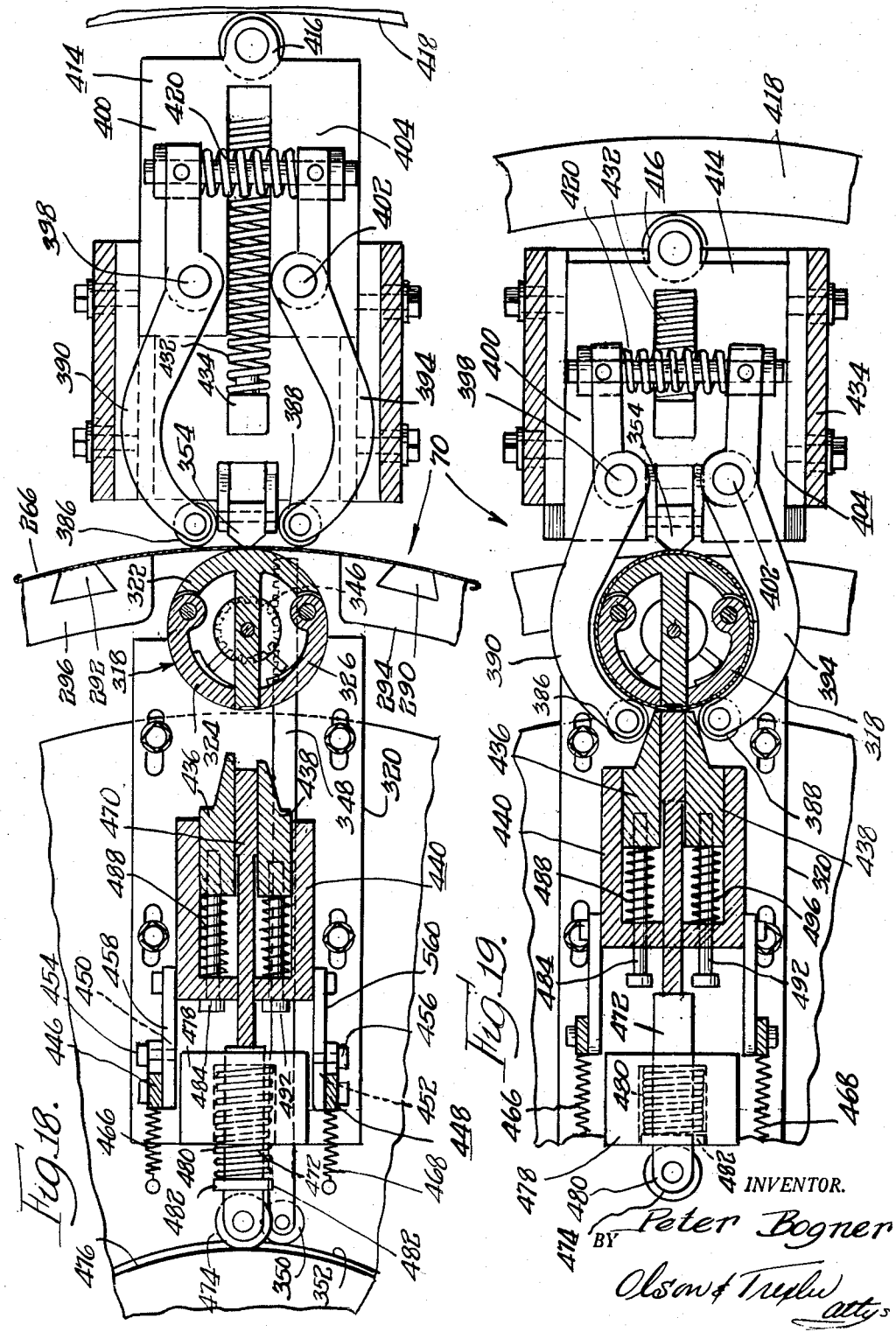

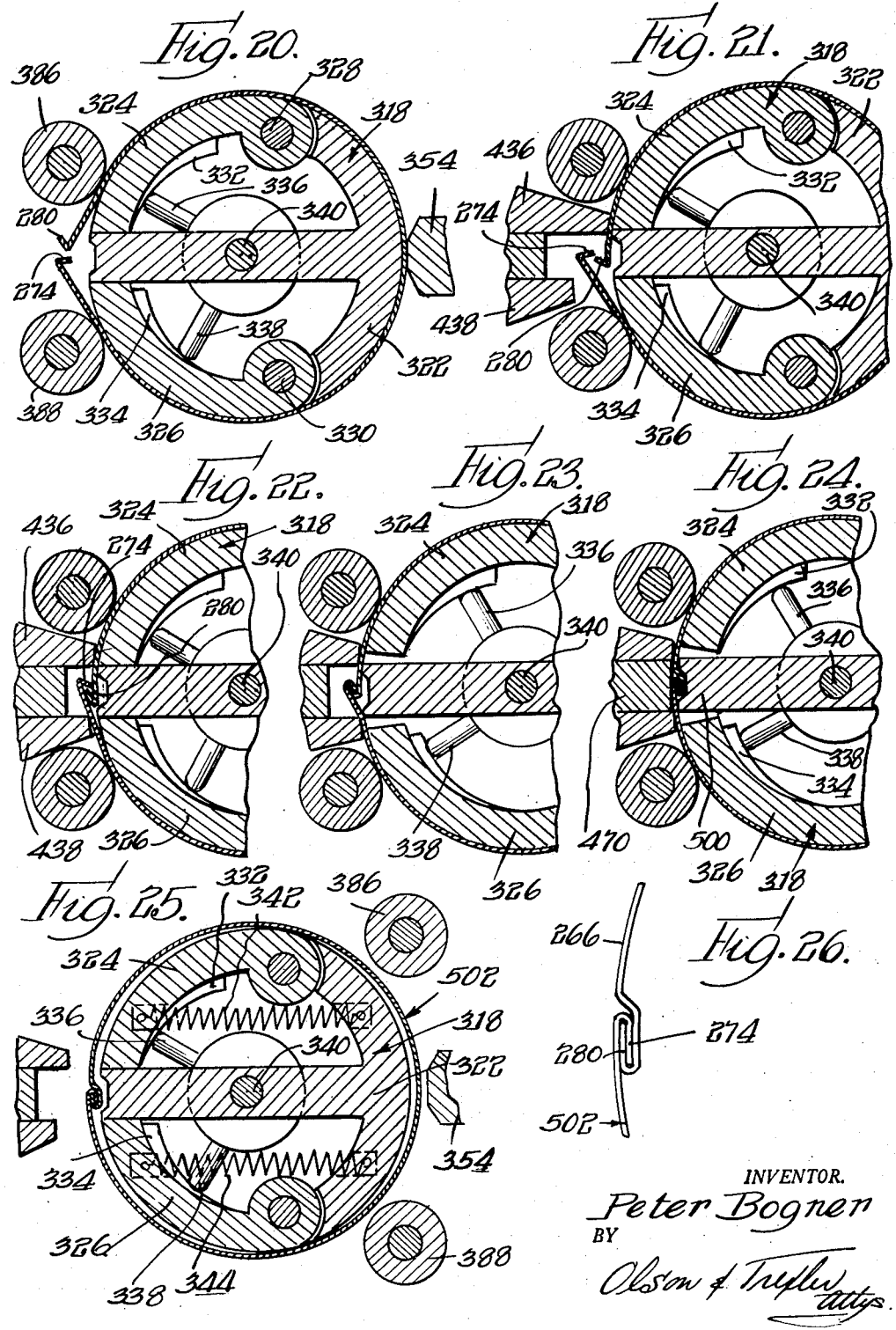

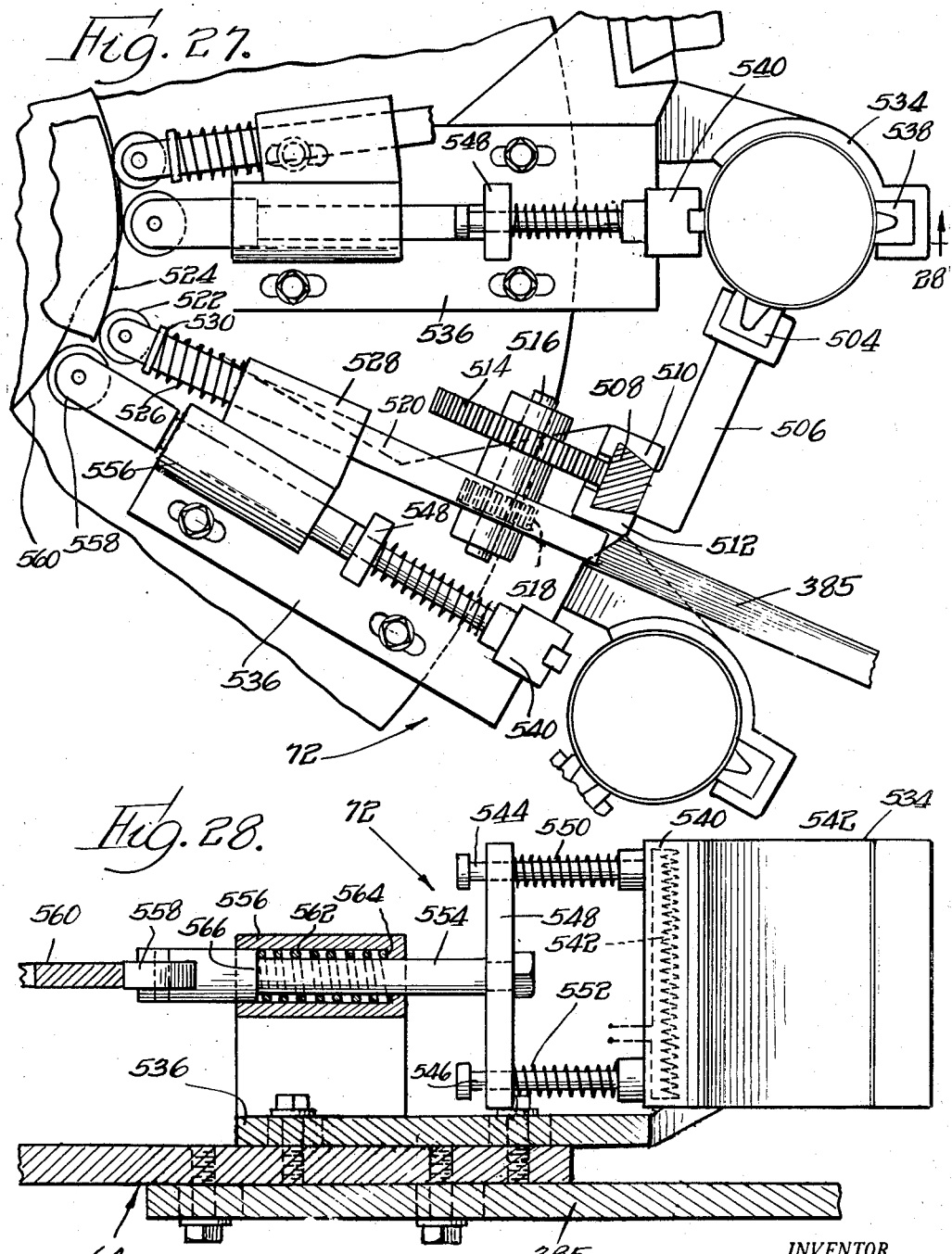

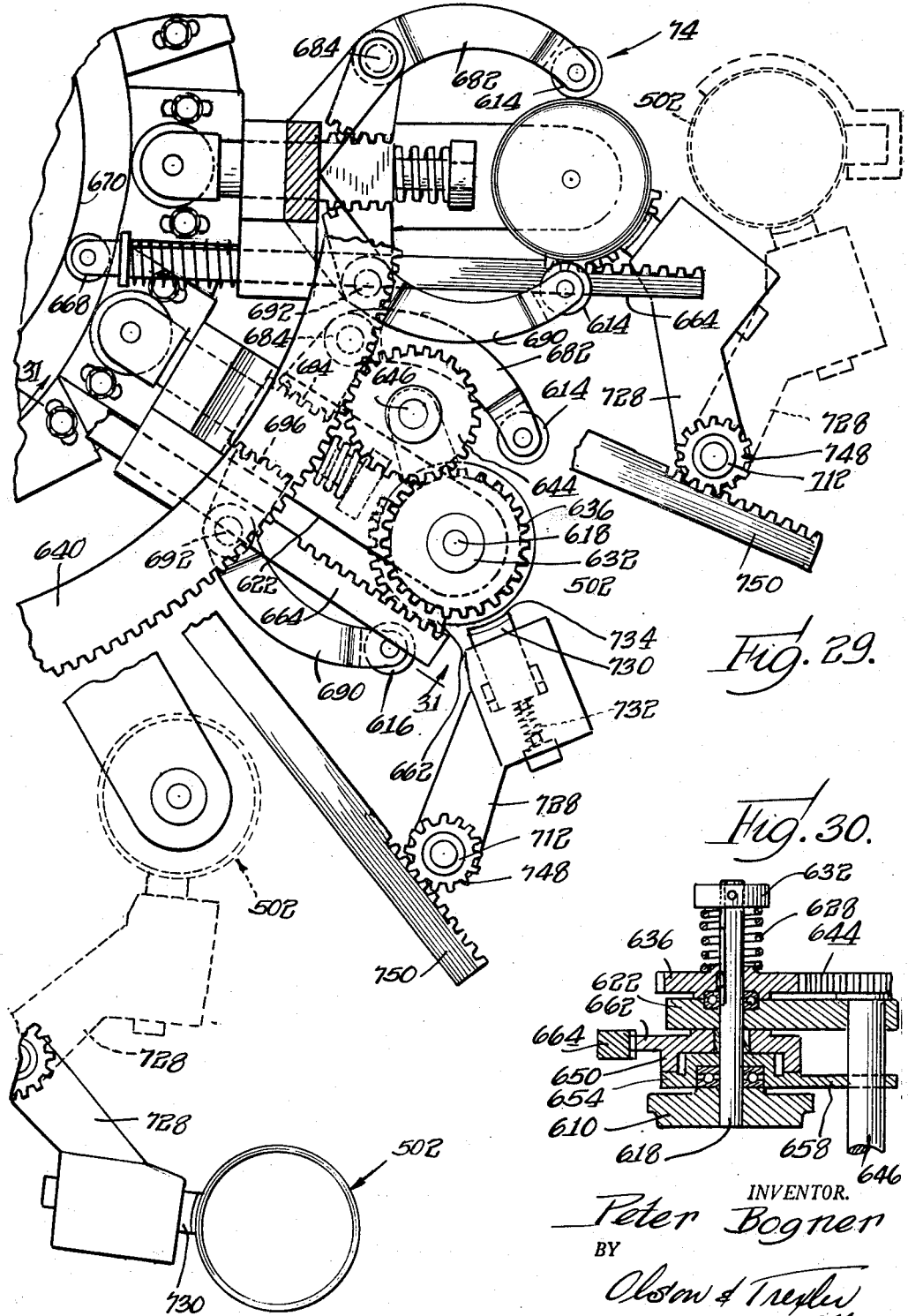

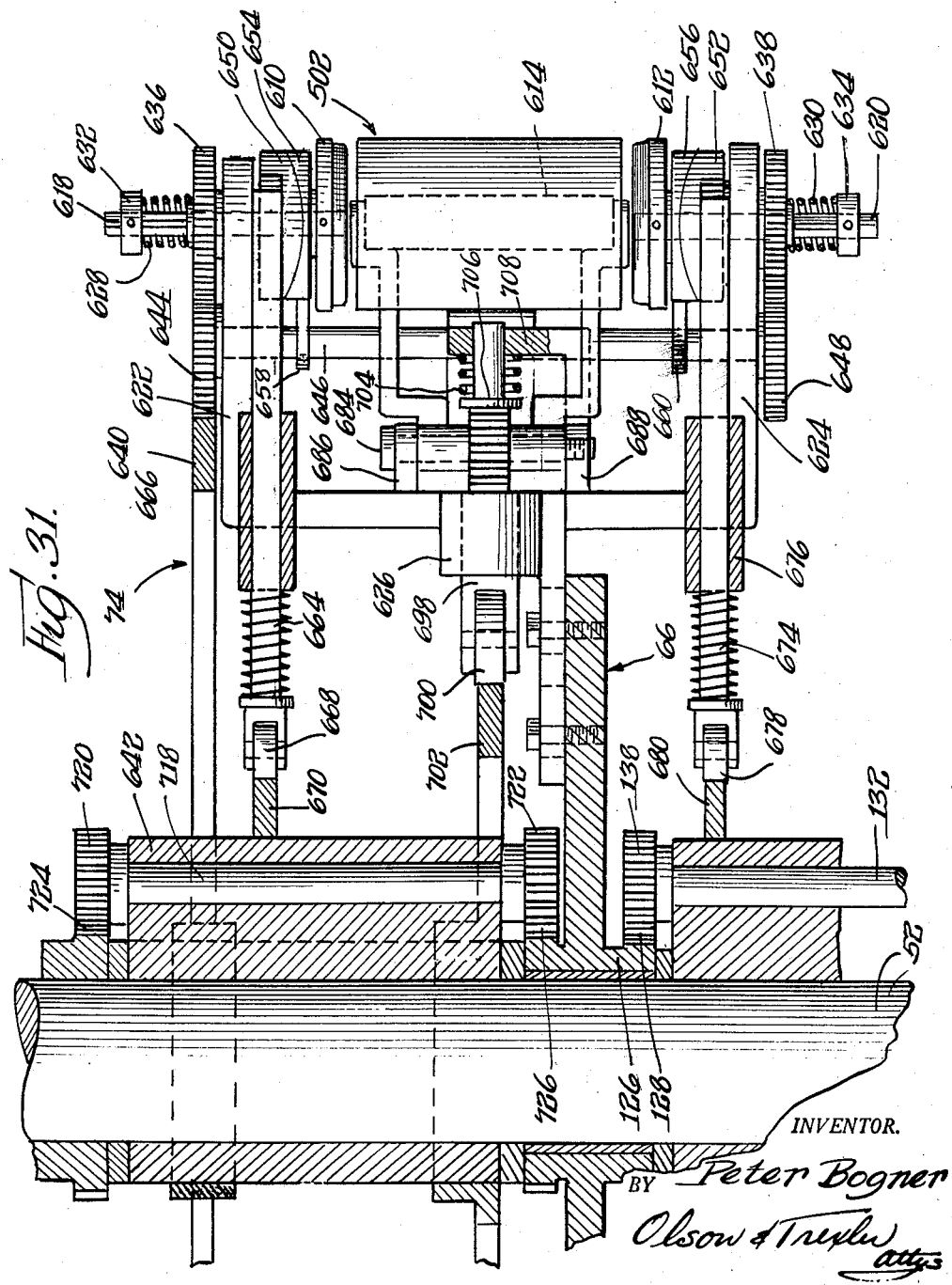

Aug. 16, 1960         P. BOGNER         2,949,087
APPARATUS FOR MAKING CANS
Filed Nov. 12, 1953         13 Sheets-Sheet 11

INVENTOR.
*Peter Bogner*
BY
*Olson & Trexler*
attys

Aug. 16, 1960    P. BOGNER    2,949,087
APPARATUS FOR MAKING CANS
Filed Nov. 12, 1953    13 Sheets-Sheet 12

INVENTOR.
Peter Bogner
BY
Olson & Trexler
attys

Aug. 16, 1960  P. BOGNER  2,949,087
APPARATUS FOR MAKING CANS
Filed Nov. 12, 1953  13 Sheets-Sheet 13
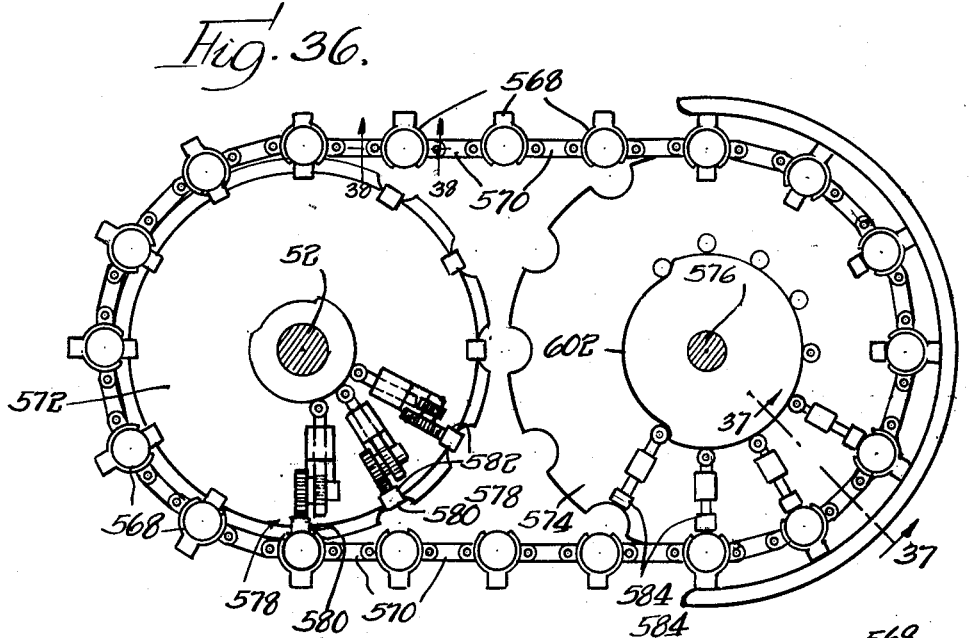
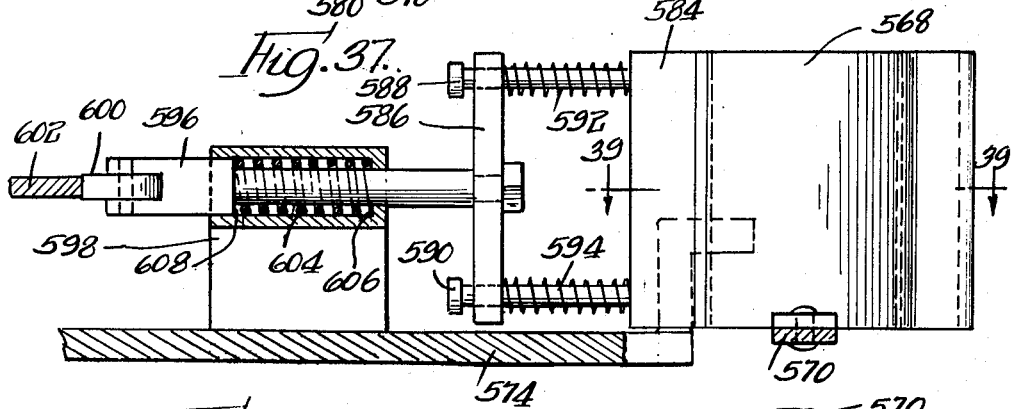
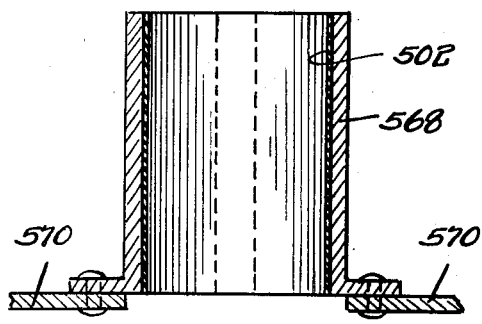
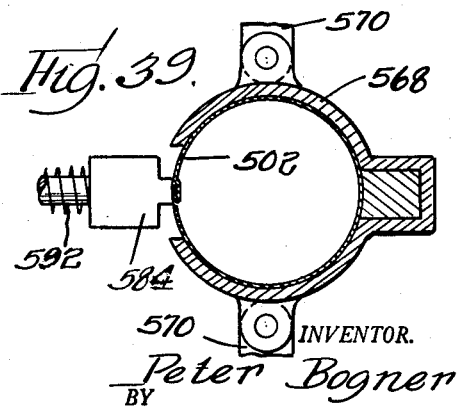
INVENTOR.
Peter Bogner
BY Olson & Trexler
attys

United States Patent Office 2,949,087
Patented Aug. 16, 1960

2,949,087

APPARATUS FOR MAKING CANS

Peter Bogner, 1930 11th St. S., Rockford, Ill.

Filed Nov. 12, 1953, Ser. No. 391,498

13 Claims. (Cl. 113—10)

The present invention relates to a novel apparatus for processing articles and more particularly to a novel apparatus for making can bodies from sheet material.

In accordance with present practice, articles such as sheet metal can bodies are usually made from large sheets of stock material, which sheet is first cut into a plurality of blanks and the blanks are then formed into can bodies. In accordance with this process, a slitting machine must be provided for cutting the sheet material into blanks of the desired size and shape and the blanks are then transported and assembled in a stack adjacent a body forming machine. A rather complicated and expensive sheet feeding means is provided for feeding the blanks from the stack to the body forming machine, which feeding means is subject to jamming, causing extensive delays in the manufacturing process. Furthermore, in accordance with present practice, the blanks are intermittently fed to a work station in the body forming machine where they are brought to rest and acted upon by appropriate tools to form can body side seam flanges and, after this, the blanks are fed to another station where they are brought to rest and formed around a horn to provide a can body having the desired cross-sectional shape. At this latter station, the side seam flanges are usually assembled and hammered together. It is obvious that the intermittent motion of the can body blank imposes a limitation on the rate in which can bodies may be formed. After the can bodies have been formed in the manner just described, they are usually fed along a soldering horn and the side seam is fluxed and then soldered by means of applying devices wiping across the exterior surface of the seam. This operation often results in the use of excess solder and such excess solder may give the can a rough appearance. Another disadvantage of the can body forming apparatus now in general use is that the sheet feeding means, the edge trimming and flanging means, the body forming horn and the soldering horn are arranged in a straight line whereby the apparatus requires a considerable amount of floor space.

From the body forming and soldering apparatus, the can bodies are, in accordance with present practice, transported by various means to another machine which calibrates the body and provides end seam flanges thereon. It is obvious that this additional apparatus requires further floor space and that the need for transporting the can bodies thereto is an uneconomical step in the manufacturing process.

An object of the present invention is to provide a novel unitary apparatus for forming can bodies and the like, which apparatus may require a substantially reduced amount of floor space and eliminates the need for transporting blanks and/or partially formed can bodies between machines disposed at spaced locations.

Another object of the present invention is to provide a novel apparatus for forming can bodies and the like, by which apparatus the blanks and/or partially formed can bodies are moved continuously from one work station to another whereby to eliminate any need for storing the blanks or partially formed can bodies, thus promoting economical operation.

Another object of the present invention is to provide a novel apparatus for making can bodies or other articles, which apparatus includes a plurality of work stations arranged so that a minimum of floor space is required.

A more specific object of the present invention is to provide a novel apparatus for processing articles wherein a plurality of work stations are superimposed so as to reduce the amount of floor space required for the apparatus.

Another object of the present invention is to provide a novel apparatus for processing can bodies while the can body blanks are continuously in motion so that the rate of production may be substantially increased.

A more specific object is to provide a novel apparatus as set forth in the preceding paragraph wherein means are provided for performing various processing steps on continuously moving can body blanks, which means move with the blanks.

Another object of the present invention is to provide a novel apparatus for rapidly and economically processing can body blanks from an elongated strip of sheet material which is continuously fed to the apparatus.

Still another object of the present invention is to provide a novel apparatus for forming can bodies and the like, by which apparatus solder or a suitable sealing compound is applied so that it is disposed within the can body side seam, thus providing a can body having a neat appearance and eliminating the application of any excess solder or other sealing compound.

A further object of the present invention is to provide an apparatus for processing can bodies and the like, which apparatus includes novel means for performing various processing steps on the can body in a rapid and economical manner.

Still another object of the present invention is to provide a novel apparatus of the above described type which may be rapidly adjusted to form can bodies and the like having different diameters.

Other objects of the present invention will become apparent from the following description and the accompanying drawings wherein:

Fig. 2 is a somewhat diagrammatic cross-sectional view reduced in size and taken along line 2—2 in Fig. 1;

Fig. 3 is a somewhat diagrammatic horizontal cross-sectional view reduced in size and taken along line 3—3 in Fig. 1;

Fig. 3a is an enlarged fragmentary view similar to Fig. 3 and shows the relative position of the tools illustrated in Figs. 2 and 3;

Fig. 4 is a somewhat diagrammatic horizontal cross-sectional view reduced in size and taken along line 4—4 in Fig. 1;

Fig. 5 is a somewhat diagrammatic cross-sectional view reduced in size and taken along line 5—5 in Fig. 1;

Fig. 6 is an enlarged fragmentary cross-sectional view taken along line 6—6 in Fig. 2;

Fig. 7 is a fragmentary cross-sectional view taken along line 7—7 in Fig. 6;

Fig. 8 is an enlarged fragmentary cross-sectional view taken along line 8—8 in Fig. 6;

Figs. 9, 10 and 11 are cross-sectional views similar to Fig. 8 and illustrate the operation of the tools for cutting the can blanks and forming the can body side seam flanges;

Figs. 12, 13 and 14 are enlarged fragmentary elevational views illustrating the manner in which sheet material stock is severed and formed by the devices shown in Figs. 8 through 11;

Fig. 15 is an enlarged fragmentary cross-sectional view taken along line 15—15 in Fig. 3;

Fig. 16 is a fragmentary cross-sectional view taken along line 16—16 in Fig. 15;

Fig. 17 is a cross-sectional view of reduced size taken along line 17—17 in Fig. 15;

Fig. 18 is a fragmentary cross-sectional view taken along line 18—18 in Fig. 15;

Fig. 19 is a fragmentary cross-sectional view similar to Fig. 18 and illustrates the operation of this portion of the apparatus;

Figure 34:
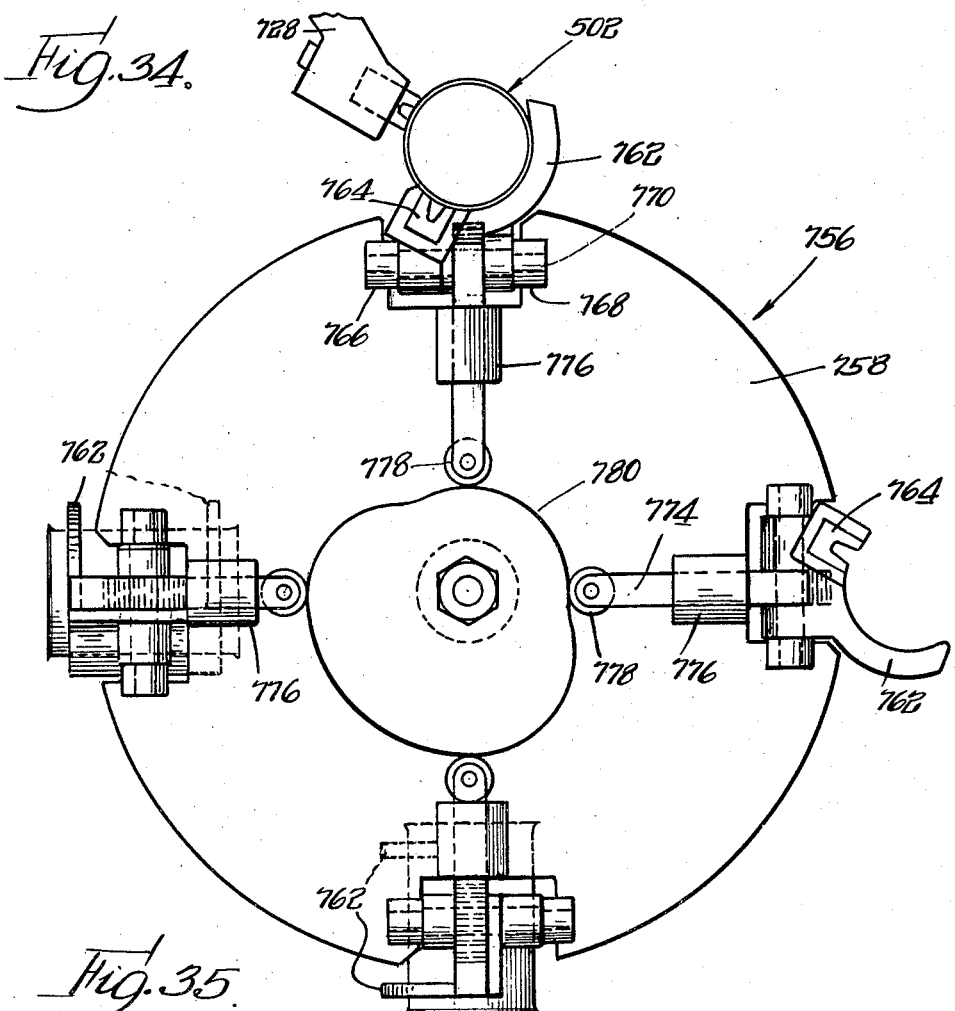
Figure 35:
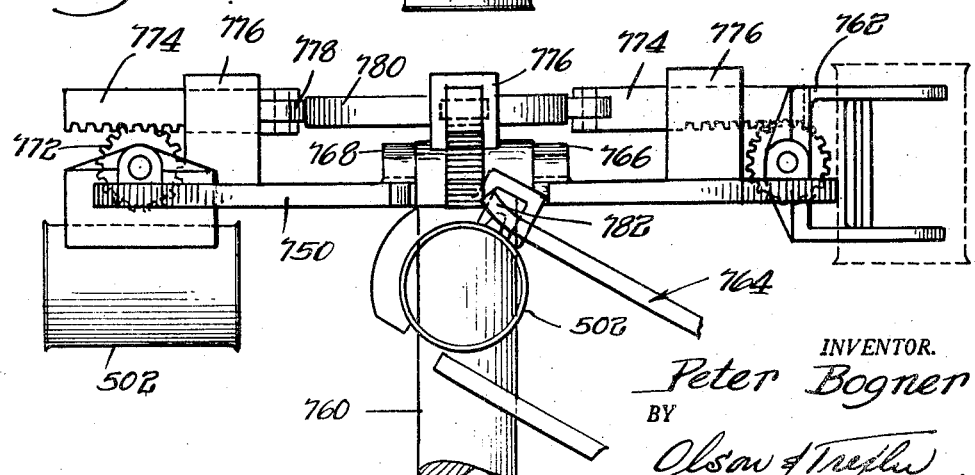

Figs. 20 through 25 inclusive are enlarged fragmentary cross-sectional views similar to Figs. 18 and 19 and further illustrate the manner in which a can body blank is formed around a horn and the side seam flanges are interlocked and hammered together;

Fig. 26 is an enlarged fragmentary end view of the can body showing the side seam in greater detail;

Fig. 27 is an enlarged fragmentary cross-sectional view similar to Fig. 4 and shows this portion of the apparatus in greater detail;

Fig. 28 is a fragmentary cross-sectional view taken along line 28—28 in Fig. 27;

Fig. 29 is an enlarged fragmentary cross-sectional view similar to Fig. 5 and shows this portion of the apparatus in greater detail;

Fig. 30 is a fragmentary cross-sectional view taken generally parallel to shafts 618 and 646 in Fig. 29;

Fig. 31 is a fragmentary cross-sectional view taken along line 31—31 in Fig. 29;

Fig. 32 is a fragmentary elevational view taken along a plane to the left of and parallel to the shafts 618 and 620 in Fig. 31;

Fig. 33 is a fragmentary elevational view similar to Fig. 32 but illustrates the operation of this portion of the apparatus;

Fig. 34 is an enlarged plan view similar to Fig. 5 and shows a mechanism for discharging can bodies from the body processing apparatus;

Fig. 35 is a side elevational view of the mechanism shown in Fig. 34;

Fig. 36 is a horizontal cross-sectional view illustrating a modified form of the present invention which may be substituted for that portion of the apparatus shown in Fig. 4;

Fig. 37 is an enlarged cross-sectional view taken along line 37—37 in Fig. 36;

Fig. 38 is an enlarged cross-sectional view taken along line 38—38 in Fig. 36; and Fig. 39 is a fragmentary cross-sectional view taken along line 39—39 in Fig. 37.

Figure 1:
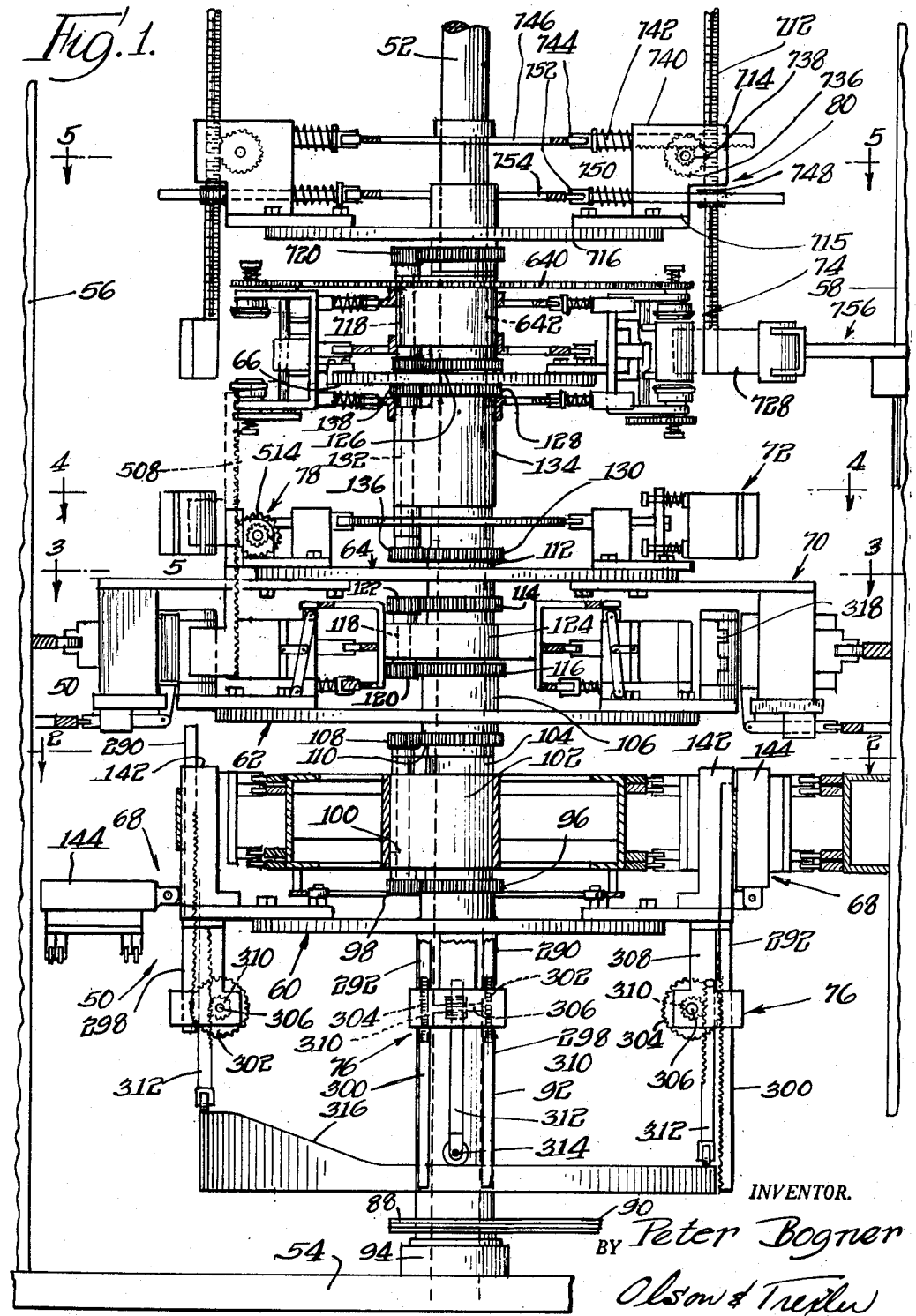
Fig. 1 is a side elevational view of the apparatus embodying the features of this invention in which view certain details have been omitted.

Referring now more specifically to the drawings wherein like parts are designated by the same numerals throughout the various figures, an apparatus 50 for processing can bodies is shown best in Fig. 1. It is understood that many details have been omitted from this figure in order to illustrate the novel features of this invention more clearly. In accordance with an important feature of this invention, the apparatus 50 is constructed and arranged so that a minimum of floor space is required and thus the apparatus includes a fixed vertical post 52 supported at its lower end in a base 54 and at its upper end by suitable frame means. This frame means may include a plurality of vertical members 56 and 58 surrounding the centrally located post or shaft 52 and horizontal frame members, not shown, may be provided between the upper ends of the vertical members 56 and 58 to provide the support for the upper end of the post 52. While only two vertical frame members 56 and 58 have been illustrated, it is understood that additional and similar vertical frame members may be spaced around the post 52 and such frame means may be utilized to support fixed cans or the like in the manner described below. A plurality of platform means 60, 62, 64 and 66 are rotatably mounted on the post 52 and these platform means are adapted to support various devices and mechanisms for processing a can body. For example, in the particular embodiment illustrated, the platform means 60 carries a plurality of devices 68 for slitting and bending sheet material stock to provide a can body blank having side seam flanges at the ends thereof and a plurality of mechanisms 70 are associated with platform means 62 for forming a blank into a can body with the side seam flanges interlocked. Also, in accordance with the particular embodiment illustrated, the platform means 64 carries a plurality of devices 72 for processing the can body side seams to seal the same and the platform means 66 carries a plurality of mechanisms 74 for calibrating the can bodies and forming end seam flanges thereon. In order to transfer a can blank or a partially formed can body from one platform means to the next, suitable lifting devices are provided and thus lifting mechanism 76 is provided for transferring blanks from platform means 60 to platform means 62. Other lifting mechanisms 78 are arranged to transfer a partially formed can body from the platform means 62 to the platform means 64 and still other lifting mechanisms 80 are provided for transferring the partially formed can bodies from the platform means 64 to the platform means 66. While the apparatus thus far described is particularly useful for processing can bodies and for performing certain steps in the manufacturing process of can bodies, it will be apparent that certain principles of this invention may be useful for processing articles other than can bodies and that the apparatus disclosed to illustrate this invention might be modified to perform additional or different steps in the processing of can bodies. Furthermore, while in accordance with the preferred embodiment of this invention, the post 52 is vertically disposed, it may be desirable in certain instances to arrange the post horizontally or at some other angle to the vertical.

In accordance with another important feature of this invention, the rotatable platform means 60 through 66 are continuously driven and a strip of sheet material stock is continuously fed into the apparatus so that can bodies may be processed while continuously moving through the apparatus, thereby facilitating rapid and economical manufacturing of the can bodies. In order to accomplish this, the platform means are continuously driven by a motor 82 or any other suitable source of power. As shown best in Figs. 1 and 2, the motor 82 is connected to a speed reducer 84 of standard construction, which speed reducer has an output sprocket 86 connected with a large sprocket wheel 88 by means of a chain 90. The sprocket wheel 88 is fixed on a sleeve 92 rotatably surrounding the upstanding post 62 and supporting the platform means 60. Preferably, the sleeve 92 is supported against downward axial movement by a suitable thrust bearing 94. A gear 96 is fixed to the upper end of the sleeve 92 and meshes with a pinion 98 fixed to a shaft 100 journaled in a bearing member 102. The bearing member 102 is bolted or otherwise fixed to the post 52 and a suitable thrust bearing 104 is disposed at the upper end thereof for supporting another rotatable sleeve 106, which sleeves carries the platform means 62. This sleeve is driven at the same speed as the sleeve 92 and platform means 60 by means of a pinion 108 fixed on the shaft 100 and meshing with a gear 110. Similar drive means is provided between the platform means 62 and 64 and between the platform means 64 and 66 so that all of the platform means are continuously driven in timed relationship with each other. More specifically the platform means 64 is carried with a rotatable sleeve 112, which sleeve is provided with a gear 114 at its lower end and is driven from a gear 116 fixed to the sleeve 106 through a pinion shaft 118 having pinions 120 and 122 fixed thereon. The pinion shaft 118 is journaled in a bearing and bracket member 124 which is fixed to the upstanding post 52. The platform means 66 is also carried by a rotatable sleeve 126 having a gear 128 fixed thereon, which gear is driven by a gear 130 fixed to the sleeve 112 through a pinion shaft 132 journaled in the bearing and bracket member 134 and carrying pinion gears 136 and 138.

Referring particularly to Fig. 2, it is seen that in accordance with a preferred form of the present invention, a plurality of the blank cutting and side seam flange forming means 68 are spaced around the platform means 60. A roll 140 of suitable material such as sheet metal is disposed so that the strip of sheet metal may be directed generally tangentially of the platform means 60 and inserted into the mechanism 68. As will appear from the description herein below, the strip sheet material is gripped by one of the mechanisms 68 and drawn along therewith so that continuous feeding of the sheet material is obtained. The strip of sheet metal 140 has a width which is substantially equal to the height of the can body to be formed and the mechanisms 68 are spaced so that the strip is cut into blanks having the proper length for the particular size of can bodies to be formed.

The structure of the mechanism 68 is best illustrated in Figs. 6 through 11 and includes a pair of opposed die supporting blocks 142 and 144. The block 142 is fixed to a plate member 146 in any suitable manner, not shown, and the plate member is secured to the platform means 60 by the bolt assemblies 148. In order to permit radial adjustment of the die blocks, the platform means is preferably provided with elongated slots 150 and 152 through which the bolt assemblies extend. As will become apparent from the following description, the length of the blanks formed by the mechanisms 68 may be changed by adjusting the mechanisms radially on the platform means. The strip of sheet material is fed between the die blocks 142 and 144 from a position located in the same general horizontal plane and, therefore, means is provided for pivoting the die block 144 to the position shown by broken lines in Fig. 6 to permit entry of the sheet metal strip. The die block 144 is pivotally mounted to the block 142 by means of a bifurcated bracket 154 and a pin 156 which extend through the arms of the bracket and an ear 158 depending from the die block 144. The ear is provided with a gear sector 160 which meshes with a rack 162 so that upon movement of the rack, the die block 144 is pivoted to and from the positions shown in solid and broken lines. The rack 162 is slidably disposed within a guideway formed in the plate member 146 and a roller 164 is mounted on the rack for cooperation with a ring cam 166 to move the rack toward the left as viewed in Fig. 6. Upon such movement of the rack, the die block is pivoted to the horizontal position shown in dotted lines and, in order to return the rack toward the right, a spring 168 is connected to the die block 142 as at 170 and to an extension 172 of the roller supporting pin. The cam 166 preferably completely encircles the upstanding post or shaft 52 and it is understood that the cam is suitably formed to actuate the die block 144 in the desired manner. In order to support the cam 166, as well as other actuating cams described below, a supporting frame including an annular member 174 and a plurality of spokes 176 is secured to the fixed bearing and bracket member 102. The cam 166 may be connected to the annular member 174 by means of a plurality of spacing blocks 178 welded or otherwise fixed to the cam and the annular member.

The die block 142 slidably supports a pair of die members 180 and 182 and die block 144 slidably supports similar and cooperating die members 184 and 186. Die 180 is connected to upper and lower actuating arms 188 and 190 carrying rollers 192 and 194 respectively, which rollers are adapted to cooperate with actuating cams 196 and 198. The die 182 is connected to similar actuating members 200 and 204 carrying rollers 206 and 208 for cooperative engagement with cams 210 and 212. The cams 196, 198, 210 and 212 are preferably in the form of rings which are secured to the annular support member 174 and they are, of course, formed to actuate the dies 180 and 182 in the manner described more fully below. In order to urge the dies 180 and 182 toward their respective actuating cams, a plurality of compression springs 214 are disposed between the die block and an abutment surface 216 formed on the die 180 and similar springs 218 are disposed between the die block and an abutment surface 220 on the die 182.

The dies 184 and 186 and the die block 144 are actuated and controlled in much the same manner as the dies 180 and 182. Thus, a plurality of actuating cams 222, 224, 226 and 228 are supported at a position located radially outwardly from the dies by any suitable means such as a support member 230 fixed to the upstanding frame member 56 and other similar frame members, not shown. However, in order to permit the die block 144 to pivot to its horizontal position, the cams 222 through 228 and support member 230 are interrupted between the ends 232 and 234 (see Fig. 2). The die member 184 is provided with actuating members 236 and 238 carrying rollers 240 and 242 for engagement with the cams 222 and 224 and the die member 186 is connected to similar actuating members 244 and 246 carrying rollers 248 and 250 for cooperative engagement with the cams 226 and 228. In addition, springs 252 and 254, similar to the above described springs 214 and 218, may be provided for yieldably biasing the dies 184 and 186 radially outwardly toward their respective actuating cams and a generally U-shaped member 256 is secured to the die block and encloses the die members 184 and 186 for limiting such radially outward movement as the die block passes the interrupted portion of the actuating cams. If desired, a similar U-shaped member 258 may be secured to the die block 142 for limiting radially inward movement of the dies 180 and 182 and the actuating cams for these dies may also be interrupted.

Referring now particularly to Figs. 8 through 14, the manner in which the sheet material strip 140 is cut and formed to provide can body blanks will be described. As shown in Fig. 8, the sheet material strip as it is fed into the apparatus is first clamped between the die blocks 142 and 144. It is understood, of course, that the platform members 60 carrying these die blocks is continuously rotating so that the actuating rollers of the die members ride along the surfaces of the fixed cams. The cams 196, 198, 222 and 224 are formed so that the die members 182 and 184 which have shearing edges 260 and 262 are moved in the manner shown in Fig. 9 so that the sheet material strip 140 is severed into two sections 264 and 266. As shown in Fig. 12, the sheet material sections 264 and 266 are severed along line 268 and, in addition, the shearing dies are formed so that pieces 270 and 272 are struck from the section 266 leaving a tab 274 and the section 264 is slit as at 276 and 278 to provide a foldable tab 280. As the dies move to the position shown in Fig. 9, the sheet material strip is not only cut in the manner just described but the tabs 274 and 280 are also folded so that they extend generally perpendicularly to the sheet material strip in opposite directions. Upon further movement of the dies relative to their respective cams, the die members 182 and 184 are withdrawn and the die members 180 and 186 are advanced toward each other in the manner shown in Figs. 10 and 11. The die members 180 and 186 are respectively provided with cam surfaces 282 and 284 which are adapted to engage the partially folded flanges 280 and 274 and as the dies are advanced to the position shown in Fig. 11, these flanges are folded back relative to their respective sheet material sections by additional bending surfaces 286 and 288 on the dies to provide properly shaped flanges for a can body side seam.

It should be noted that the mechanisms 68 are spaced around the platform means 60 so that the distance between the shearing edges 260 and 262 of adjacent mechanisms is equal to the length of the can body blank and that each of the mechanisms 68 is operative to form the trailing edges of one can body blank and the leading edge of the next can body blank as shown in Fig. 14.

After the can body blanks have been formed by the mechanisms 68, they are raised into operative association with the mechanisms 70 on the platform means 62. In order to accomplish this transfer of the can body blanks while the apparatus is continuously in motion, a plurality of lifting devices 76 are provided, which lifting devices are operable between adjacent mechanisms 68. The lifting devices 76 are shown best in Figs. 1, 2 and 7 and include a pair of permanent bar magnets 290 and 292 which are slidably disposed for vertical movement. As shown best in Figs. 2 and 7, forming blocks 294 and 296 are mounted on each plate member 146 and at opposite sides of each die block 142. The sheet material stock, as it is fed in the machine, is formed around the blocks 294 and 296 and is held thereagainst by the permanent magnets 290 and 292 which are slidably mounted in grooves suitably formed in the blocks. After the can body blank has been formed, a pair of the magnets 290 and 292 between adjacent mechanisms 68 are raised to transfer the blank to the mechanism 70 associated with the platform 62. As shown best in Fig. 1, the lower ends of the bar magnets 290 and 292 are provided with rack extensions 298 and 300 which are adapted to mesh with gears 302 and 304 respectively. The gears 302 and 304 are fixed to a common shaft 306, which shaft is journaled in a bracket 308 depending from the plate member 146. A pinion gear 310 is also fixed on the shaft 306 and meshes with a rack 312 having a roller 314 at its lower end. An annular cam member 316 is suitably supported on the base of the apparatus and is positioned for engagement with the roller 314 so that as the roller rides up the high portion of the cam, the rack 312 drives the gear 310 and the gears 302 and 304, which gears are in turn operable to raise the bar magnets.

The mechanism 70 for forming a blank into a can body is shown best in Figs. 1, 3, and 15 through 25. This mechanism includes an expandable horn 318 which is mounted on a plate member 320 secured to the platform means 62 in a manner to permit radial adjustment. The horn includes a fixed semi-circular section 322 and a pair of sections 324 and 326 hinged thereto by pins 328 and 330 respectively. The hinged section 324 is provided with an internal cam surface 332 and the hinged section 326 is provided with a similar cam surface 334. These cam surfaces are cooperable with pins 336 and 338 mounted on a centrally located rotatable shaft 340 so that upon rotation of the shaft in a clockwise direction, as viewed in Figs. 20 through 25, the hinged sections are swung or expanded outwardly, as shown for example in Fig. 23. Upon counterclockwise movement of the pins, the hinged sections are collapsed inwardly and are normally retained in such collapsed relationship by means of springs 342 and 344. In order to actuate the pins 336 and 338 to expand and contract the horn for the purpose described more fully below, a gear 346 is fixed to the lower end of the shaft 340 and is operated by means of a slidably mounted rack 348 having a roller 350 mounted at an end thereof and disposed for engagement with a fixed cam 352. After a can blank which may be conveniently numbered 266 has been delivered by the abovedescribed transfer mechanism 76 to a position adjacent a horn 318, as shown in Fig. 15, the blank is held against the horn by a clamping pad 354, which clamping pad is mounted on the end of a lever 356 pivotally connected to a support plate 358 by a pivot pin 360. An actuating rod 362 is connected to the lever by pin 364 and is slidably disposed within a block 366 secured to the support plate 358. The opposite end of the actuating rod carries a roller 368 which rides along a ring cam 370 fixed to the vertical frame members 56 and 58 and the like. It will be understood that the cam 370 is formed so as to move the actuating rod 362 toward the left, as viewed in Fig. 15, and thus pivot the clamping pad 354 away from the horn to permit entry of a can body blank between the pad and the horn. In order to return the actuating rod 362 toward the right, a compression spring 372 is disposed within the block 366 and is pressed between a shoulder 374 formed on the internal surface of the block and a shoulder 376 provided on the actuating rod. It should also be noted that in order to permit passage of can body blanks to the position adjacent the horn, shown in Fig. 15, a continuous annular space 378 is provided between the plate members 320 and 358 and thus each plate member 358 is carried by a bracket 380 connected with the platform means 64 and having a pair of spaced arms 382 and 384, as shown best in Figs. 15 and 17. The arms are interconnected at their upper ends with a spoke member 385 which is operatively connected with the platform means 64.

In order to form a can body blank around the horn 318, a pair of rollers 386 and 388 are provided for pressing the blank against the horn. The roller 386 is carried between a pair of bell cranks 390 and 392 and the roller 388 is similarly carried between a pair of bell cranks 394 and 396. These bell cranks are mounted for pivotal movement and also for radial movement with respect to the horn so that the rollers are operable to press the can body blank against a substantial portion of the peripheral surface of the horn. Thus, the bell cranks 390 and 392 are pivotally mounted by means of a pin 398 to a slide block 400 and the bell cranks 394 and 396 are pivotally mounted by a pin 402 to a slide block 404. The slide blocks are in turn mounted on guideways 406 and 408 which are fixed to brackets 410 and 412 secured to the support plate member 358. As shown in Figs. 15, 18 and 19, the slide blocks 400 and 404 are connected together by a cross head 414 and a roller 416 is carried on the cross head 414 for cooperative engagement with a fixed ring cam 418. It is understood that the cam 418 is formed so as to actuate the slide members and thus the forming rollers 386 and 388 toward the left in the manner shown in Fig. 19 so as to form the can body blank around the horn. In order to maintain the pressure of the rollers against the horn, springs 420 and 422 are disposed between the ends of the bell cranks as shown in Figs. 15, 18 and 19. These springs may conveniently be supported on rods 424 and 426 which rods extend through blocks 428 and 430 fixed to the bell cranks. With this structure, it is seen that as the bell cranks are moved radially inwardly with respect to the horn, the can body blank is tightly pressed against the horn. In order to move the slide members and the bell cranks carried thereby radially outwardly after this portion of the can body forming process has been performed, a compression spring 432 is provided between cross head 414 and suitable abutment means 434 fixed to the support plate member 358 and the cam 418 is of course shaped to permit such radially outward movement.

After the can body blank has been formed around the horn by the rollers 386 and 388, the side seam flanges are interlocked with each other and hammered together. This operation is accomplished by the means shown best in Figs. 15, 16, and 18 through 25 and includes a pair of pressure members 436 and 438 which are carried by a generally U-shaped slide member 440. As shown best in Fig. 16, the slide member 440 is mounted on a guide block 442 fixed to the support plate member 320. The slide block 440 and the pressure members carried thereby are actuated toward the horn by means including a bifurcated lever 444 having arms 446 and 448 pivotally connected to ears 450 and 452 by pins 454 and 456. The bifurcated lever is connected with the slide member by links 458 and 460 and the lever carries at its upper end the roller 462 adapted to engage a fixed ring cam 464. The cam 464 is of course formed so that the slide block is moved toward the right as viewed in Fig. 15 to press the pressure members against the horn. The cam member is also formed so that after the can body side seam has been completed, the slide member may move toward the left. In order to accomplish this movement, springs 466 and 468 are connected between the arms of the lever 444 and the support plate member 64. A hammer member 470 is also carried by the slide member 440 and is disposed between the pressure members 436 and 438. The hammer member is connected to an actuating rod 472 having a roller 474 mounted on an end threeof for engagement with a fixed ring cam 476. The actuating rod slidably extends through a block 478 fixed to the guide block 442 and a compression spring 480 is disposed between the block 478 and a collar 482 fixed on the actuating rod for biasing the rod toward its actuating cam.

The operation of the mechanism 70 is illustrated best in Figs. 18 through 25. In Fig. 18, a blank 266 is shown positioned against the horn 318. As the apparatus is rotated, the roller 416 travels along the fixed cam 418 and actuates the forming rollers 386 and 388 toward the left so that they press the can body blank around the horn as shown in Figs. 19 and 20. At this point in the operation, the hinged sections 324 and 326 of the horn are in their collapsed positions so that the diameter of the horn is slightly less than the diameter of a finished can body. Upon further movement of the apparatus, the slide member 440 is advanced toward the horn so that the longer pressure member 436 engages the blank and presses one end thereof tightly against the horn. The pressure member 436 is movable relative to the slide member 440 and is retained by means of a pair of headed bolts 484 and 486 which slidably extend through suitable apertures in the member 440. Springs 488 and 490 are disposed on the bolts for urging the pressure member 436 toward the horn. The pressure member 438 is similarly slidably mounted in the member 440 by means of headed bolts 492 and 494 and springs 496 and 498. Thus, after the parts have reached the position shown in Fig. 21, further movement of the slide member 440 toward the horn causes the shorter pressure member 438 to move forwardly relative to the pressure member 436 and press the opposite end of the can body blank against the horn as shown in Fig. 22. In this position, it is seen that the side seam flanges 274 and 280 are in overlapping relationship so that upon actuation of the cam fingers 336 and 338 to spread the hinged sections of the horn, the can body blank is expanded to bring the side seam flanges into interlocking relationship as shown in Fig. 23. As the apparatus continues to rotate, the hammer member 470 is forced against the side seam flanges and presses the flanges against an anvil member 500 disposed within the horn. This stem completes the formation of the side seam which is shown best in Fig. 26. After the side seam has been formed, the various actuating cams are shaped so that the forming rollers 386 and 388, the holding pad 354 and the pressure hammer members are withdrawn to the position shown in Fig. 25. At the same time the cam fingers 336 and 338 are rotated to permit collapsing of the hinged horm sections so that the can body may be easily removed from the horn.

The partially formed can body which is designated by the numeral 502 is next transferred from the mechanism 70 to the device 72 on the platform means 64 by the transfer mechanism 78 shown best in Figs. 1, 27 and 28. This transfer mechanism includes a permanent bar magnet 504 fixed in an arm 506 which is adapted to be lowered to position the magnet adjacent the can body on a horn 318 and then raised to lift the can body to a device 72. In order to accomplish this, the arm 506 is fixed to an elongated rack 508 slidably mounted between guide members 510 and 512 carried by support means 64. The rack is actuated by a gear 514 fixed to a shaft 516, which shaft also carries a pinion 518. An actuating rack 520 is slidably supported for meshing engagement with pinion 518 and the rack 520 carries a roller 522 disposed for engagement with a fixed cam 524. In order to yieldably bias the rack 520 toward its actuating cam, a compression spring 526 is disposed between the rack mounting block 528 and a collar 530 fixed on the rack.

In accordance with a feature of this invention, the can body side seam may be sealed with solder or a suitable cement or sealing compound and the solder or the like is applied in narrow strips to the sheet material 140 before the sheet material is cut into individual blanks. Thus, as shown diagrammatically in Fig. 2, a solder or sealing compound applying device 532 is provided between the sheet material supply roll and the mechanism 68. The device 532 may be of any known construction capable of applying sealing material in narrow strips spaced along the continuously moving sheet material. The width of the strip or band of sealing material applied to the sheet material stock is preferably substantially equal to the combined widths of the can body side seam flanges and the applying device is timed with respect to the spacing between mechanisms 68 so that the sheet material stock is cut into individual blanks along lines extending through a mid portion of the band of sealing material. Thus, when the blanks are formed into can bodies with the side seam flanges interlocked, the previously deposited sealing material or solder is located within the side seam. In order to hermetically seal the side seam, it is usually necessary to heat the sealing material sufficiently to cause it to flow. Such heating of the side seams may be accomplished by the devices 72 shown best in Figs. 1, 4, 27 and 28.

Each device 72 includes a pocketlike holder 534 carried by support plate member 536 mounted on platform means 64. The pocket member 534 is provided with one or more permanent magnets 538 for retaining the can body therein. A pressure member 540 is adapted to press against the side seam of the can body so that the can body may be stripped from the transfer mechanism 78. The pressure member also contains an electric resistance heating coil 542 so that as the apparatus is rotated, the sealing compound or solder within the side seam is heated sufficiently to cause it to flow thereby hermetically sealing the side seam. After the side seam has been heated, the pad is withdrawn and means, not shown, may be provided for directing a cooling blast of air against the seam. As shown best in Figs. 27 and 28, the pressure heating member or pad 542 is supported by a pair of headed bolts 544 and 546 which are slidably disposed through apertures in a head member 548. Compression springs 550 and 552 are disposed between the head member and pressure pad so that the pad may be resiliently urged against the can body. In order to actuate the pressure pad toward and away from the can body, the head 548 is mounted on an actuating rod 554 slidably mounted in a bearing block 556 and carrying a roller 558 engageable with the fixed cam 560. A compression spring 562 acts between shoulders 564 on the bearing block and 566 on the actuating rod to resiliently bias the rod toward its actuating cam. It is understood, of course, that the cam 560 is shaped so that the heating pressure pad is applied to the can body side seam for a sufficient length of time to cause the sealing material to flow and then withdraw from the side seam to permit cooling of the sealing material and to permit withdrawal of the can body from the pocket member 534. In some instances, the solder or sealing compound within the can body side seams may be such that it cannot be sufficiently heated in the time interval available as it moves around the platform means 64. In such instances, the length of the heating and cooling periods of the side seams may be increased by the apparatus illustrated in Figs. 36 through 39. In this modified form of the apparatus, a plurality of pocketlike holding members 568 are provided in place of the above described holding members 534. The holding members 568 are connected by links 570 and form a part of an endless chain which encircles and is driven by a sprocket disk 572 substituted for the above described platform means 64. The endless chain also encircles sprocket disk 574 mounted for rotation on an axle 576 disposed laterally of and parallel to the upstanding post 52. In this embodiment, lifting devices 578 are provided for transferring the can bodies from the horns to the holding members 568. These lifting devices are essentially the same as the above described lifting devices 78 except that a lifting permanent magnet 580 is mounted directly on a lifting rack 582. A plurality of heating pressure pads 584 are mounted on the sprocket disk 574 and these heating pads are substantially identical to and are actuated by substantially identical means as the heating pads 540 described above. Thus, each heating pad 584 is connected with a head member 586 by bolts 588 and 590, and springs 592 and 594 are disposed between the heating pad and the head member. The head member is fixed on an actuating rod 596 slidably mounted in a bearing block 598 secured to the sprocket disk 574 and the rod carries a roller 600 for engagement with a fixed ring cam 602. The actuating rod 596 is yieldably biased toward the cam 606 by means of a spring 604 acting between an internal shoulder 606 on the block 598 and a shoulder 608 on the rod. With this arrangement, it is seen that the heating pressure pads may be applied to the can body side seams during one-half of a revolution of the sprocket disk 574 and it will be appreciated that the heating pads 540 of the embodiment shown in Figs. 27 and 28 can be applied for only a relatively small portion of a revolution of the platform means 64 in order to allow sufficient time for the can bodies to be placed in the holders and then removed therefrom after heating. It will also be appreciated that various other endless motion means, not shown, might be provided for conveying the can bodies along a lengthened path of travel during heating thereof as long as the peripheral speeds of such means and the platform means 64 are substantially equal at the point of transfer of the can bodies from one to the other.

After the side seams of the can bodies have been sealed, the bodies are transferred to the mechanisms 74 which are operable to calibrate the bodies and form end flanges thereon. This transfer of can bodies is accomplished by the lifting devices 80 which will be described below. Referring particularly to Figs. 1, 5, 29, 30, 32 and 33, the mechanisms 74 will now be described in detail. Each mechanism 74 includes a pair of oppositely disposed end flanging heads 610 and 612 which are adapted to be inserted in opposite ends of a can body. In addition, rollers 614 and 616 are adapted to be brought into contact with the sides of the can body to cooperate with the heads 610 and 612 in forming end flanges and to calibrate or roll the body into a smooth cylinder of the desired diameter. The flanging heads 610 and 612 are slidably and rotatably mounted by means of shafts 618 and 620 on arms 622 and 624 of a mounting block or bracket 626 fixed to the platform means 66. Preferably the mounting block is secured to the platform means in a manner to permit the radial adjustment thereof. The heads 610 and 612 are normally retained in positions spaced apart sufficiently to permit the entry of a can body therebetween. This is accomplished by locating compression springs 628 and 630 on the shafts 618 and 620 respectively and between the bracket arms 622 and 624 and collars 632 and 634. In addition, gears 636 and 638 are respectively mounted on shafts 618 and 620 and are slidably keyed thereto in the manner shown best in Fig. 30. A large ring gear 640 is secured to a bracket member 642 fixed on post 52 for driving gear 636 and preferably a driving connection is provided between these gears by an idler gear 644 also mounted on bracket arm 622. The idler gear is keyed or otherwise fixed to a shaft 646 which is journaled in the bracket arm 622 and extends downwardly through a suitable bearing in the bracket arm 624. Another gear 648 is keyed to shaft 646 and is disposed for meshing engagement with the gear 638.

In order to move the end flange forming members 610 and 612 toward and away from each other for entering into and withdrawal from a can body disposed therebetween, a rotatable cam member 650 is slidably disposed on the shaft 618 and a similar cam member 652 is slidably disposed on the shaft 620. These cam members are respectively cooperable with complementary cam members 654 and 656 loosely mounted on shafts 618 and 620 and retained against rotation by a suitable means such as apertured ears 658 and 660 slidably receiving the shaft 646. The cam member 650 has a gear sector 662 extending therefrom for meshing engagement with an actuating rack 664 slidably disposed in a guide member 666 fixed to the bracket arm 622. As shown best in Fig. 31, the rack 664 carries a roller 668 for cooperative engagement with a fixed ring cam member 670. The cam member 652 also is provided with a gear sector 672 which is actuated by a rack 674 slidably disposed in a guide member 676 fixed to a bracket arm 624. This rack also carries a roller 678 which engages a fixed ring cam member 680. With this structure, it is seen that as the mechanism 74 is rotated around the fixed cams 670 and 680, the cams 650 and 652 may be turned from the positions shown in Fig. 32 to the positions shown in Fig. 33 to advance the end flanging heads toward each other and into the can body 502. After the end flanges have been formed, the cams 650 and 652 are rotated to the Fig. 32 position so that the end flanging heads may be withdrawn from the can body by means of the springs 628 and 630.

The rollers 614 and 616 are also mounted for movement into and out of engagement with a can body disposed therebetween. Thus the roller 614 is supported by a bell crank member 682 pivotally mounted by a pin 684 between ears 686 and 688 projecting from the bracket 626. The roller 616 is similarly carried by a bell crank member 690 pivotally mounted by a pin 692 extending through ears projecting from the bracket 626. These bell crank members are respectively provided with gear sectors 694 and 696, both of which are actuated by a rack 698 slidably guided in the bracket member 626. The rack is actuated in one direction by means of a roller 700 carried thereon and disposed for engagement with the fixed ring cam 702 and in the opposite direction by means of a spring 704 disposed between a shoulder member 706 fixed on the rack and an abutment member 708 fixed to the bracket 626.

In operation of the mechanism 74, a can body 502 is positioned between the end flanging heads as shown in Figs. 31 and 32 by transfer mechanism 80 which will be described in more detail below. As a mechanism 74 rotates around the center post 52, the racks 664, 674 and 698 are actuated by their respective fixed cams so that the end flanging heads are inserted into the can body and the rollers 614 and 616 are pressed into engagement with the sides of the can body as shown in Fig. 33. As will be understood, the end flanging heads are continuously rotated by the fixed ring gear 640 which meshes with the gear 644 for driving the gear 636 and also the gear 638 through the shaft 646 and gear 648. As the end flanging heads are rotated, the can body is also rotated between the rollers 614 and 616 so that the can body is calibrated and rounded as the end flanges are formed thereon.

The transfer mechanism 80 for delivering a can body from a device 72 to an end flanging and calibrating mechanism 74 is shown best in Figs. 1 and 29. This transfer mechanism includes a rack member 712 having annular teeth thereon and slidably disposed for vertical and rotatable movement in a guide member 714.

The guide member is carried on a support plate 715 which is radially adjustably mounted on a rotatable platform member 716. The platform 716 is rotated around the fixed upstanding shaft 52 by means of a shaft 718 having pinions 720 and 722 fixed on opposite ends thereof, which pinions are respectively disposed for meshing engagement with a gear 724 connected with the platform 716 and a gear 726 fixed on the rotatable sleeve 126 of the platform means 66.

At the lower end of the vertically and rotatably movable rack 712, there is mounted an arm member 728 having a permanent bar magnet 730 thereon for picking up and transferring a can body. Preferably the magnet 730 is slidably disposed within the arm 728 and is pressed outwardly by a spring 732 for initial yieldable engagement with the cam thereby permitting some error in adjustment of the apparatus without danger or injury to either the apparatus or the can body. Furthermore, the cam engaging faces of the magnet may be provided with a coating or cover 734 of brass or any other suitable material which will prevent scratching or marring of the can body. It should be understood that if desired, the above described magnets of the transfer mechanisms 76 and 78 may also be mounted for yieldable engagement with the can bodies and may also be provided with the brass coatings or jackets to prevent injury to the can bodies.

In order to raise and lower the rack 712 of the lifting mechanism 80, a cluster gear having a large gear 736 engageable with the rack 712 and a relatively small pinion 738 is rotatably mounted on a block 740 fixed to the support plate member 715. An actuating rack 742 is slidably guided in the block 740 for meshing engagement with the pinion 738 and this rack carries a roller 744 engageable with a cam 746 fixed on the upstanding post 52. Suitable spring means may be provided within the block 740 for yieldably biasing the actuating rack 742 toward the cam 746.

In order for the transfer mechanism to position a can body between the end flanging heads, it is necessary to rotate the arm 728 to swing the can body radially inwardly. This swinging movement is accomplished by providing a gear 748 which is slidably keyed to the rack 712 and an actuating rack 750 disposed for meshing engagement with the gear 748. This actuating rack also carries a roller 752 which cooperates with a fixed ring cam 754 for actuating the rack radially outwardly and suitable spring means acting between the fixed mounting block 740 and a shoulder on the rack 750 is provided for actuating the rack radially inwardly. The operation of the transfer mechanism is illustrated best in Fig. 29 wherein the uppermost can body pickup arm 728 illustrated in this figure is shown by broken lines in position for picking up a can body from a mechanism 72. As the apparatus is rotated about the central fixed post 52, the transfer mechanism 80 is actuated so that the arm 728 is elevated and pivoted inwardly to the position of the uppermost arm 728 illustrated in solid lines. Upon further rotation of the apparatus, the end flanging heads and side rollers 614 and 616 are brought into engagement with the can body as shown at the uppermost position in Fig. 29. The pickup arm 728 is then rotated slightly outwardly to release the can body until the flanging operation is completed and the flanging heads and side rollers are retracted as shown by the middle position in Fig. 29. After the end flanging and calibrating steps have been completed, the pickup arm 728 is again swung inwardly to pick up the can body as shown by the lowermost pickup arm 728 in Fig. 29 illustrated in broken lines. The transfer mechanism 80 is then actuated to swing the arm 728 to the lowermost full line position shown in Fig. 29 in order to position the can body for discharge from the forming apparatus.

After the end flanges have been formed and the can body has been withdrawn from the mechanism 74 by the transfer mechanism 80, the body is picked up by a discharge mechanism 756 shown in Figs. 1, 5, 34 and 35. This discharge mechanism includes a rotatable turret or disk 758 supported by a shaft 760, which shaft is driven by suitable means, not shown, in timed relationship with rotative movement of the transfer mechanism 80 around the central upstanding shaft 52. Any suitable means, not shown, may be provided for rotatably supporting the discharge mechanism shaft 760 in the position generally indicated in Figs. 1 and 5. A plurality of can body receiving and retaining pocket members 762 are carried on the disk 758 for receiving the can bodies from the transfer mechanisms 80. Each of the pocket members 762 preferably includes a permanent bar magnet 764 for holding the can body therein. Since the can bodies are retained by the transfer mechanism 80 with their longitudinal axes extending vertically, pocket members 762 are also mounted so that their longitudinal axes extend vertically as the pocket members initially engage can bodies. In addition, the pocket members are supported so that they may be swung to a horizontal position whereby the can bodies may be deposited in a chute of any well-known structure and generally designated by the numeral 764. In order to accomplish this, each pocket member 762 is pivotally mounted between a pair of lugs 766 and 768 carried by the disk 758 by means of a shaft 770. The pocket members are fixed to their respective shafts and also fixed on each shaft is a gear 772 which meshes with one of a plurality of actuating racks 774. Each of the actuating racks is slidably guided in a block 776 and carries a roller 778 for engagement with a fixed actuating cam 780 supported in any suitable manner not shown. Suitable spring means, not shown, acting between shoulders on the block 776 and the actuating rack member 774 are provided for yieldably biasing the racks radially inwardly to maintain the rollers in contact with the cam.

The operation of the discharge mechanism 756 is illustrated best in Figs. 34 and 35 wherein the uppermost pocket member 762 shown in Fig. 34 is in position to receive a can body from the pickup arm 728 of the transfer mechanism 80. As the discharge mechanism rotates about the fixed cam 780 in a counterclockwise direction, the actuating rack 774 is first moved outwardly to rotate the can body to a horizontal position so that it may be stripped from the holder by a finger 782 on the chute 764 and then the rack is moved radially inwardly by the above mentioned spring means to reposition the holder for receiving another can body.

In accordance with the present invention, can bodies may be rapidly and economically processed with the above described apparatus in the following manner. A long strip of sheet metal or other suitable material, preferably in roll form, is supported on means, not shown, adjacent the apparatus and fed through the solder or sealing compound applying mechanism 532 and clamped between the die blocks 142 and 144 and one of the mechanisms 68. The motor 82 is then energized to rotate the various platform means about the central post 52 and to actuate the solder applying mechanism through suitable means, not shown, in timed relationship with such rotating movement of the platform means. As set forth more fully herein above, narrow bands of solder or the like are applied to the sheet material strip 140 at spaced intervals and the strip is severed along lines extending through the solder bands by mechanisms 68. After the side seam flanges have been formed by the mechanism 68 and while the apparatus is continuously moving, the can body blanks are transferred to the body forming mechanisms 70 where the blanks are formed around horns and the side seams are interlocked and hammered together. The partially processed can bodies are then picked up by the transfer mechanisms 78 and carried to the heating devices 72 where sufficient heat is applied to cause the solder or sealing compound to flow thereby hermetically sealing the can body side seams. After this step has been completed, the can bodies are raised by the transfer mechanisms 80 to the calibrating and end flanging mechanisms 74 where the bodies are provided with end seam flanges as described above. While in the particular embodiment illustrated, the can bodies are removed from the mechanisms 74 and discharged from the apparatus, it is contemplated that additional mechanisms might be mounted for rotation about the central post 52 for further processing the bodies. For example, means, not shown, for applying closures or ends to the can bodies might be mounted on a rotatable platform above the end flanging mechanism 74. It is obvious that the diameter of the can bodies depends on the length of the body blanks formed by the apparatus and, in accordance with another feature of this invention, the apparatus may be adjusted to form bodies of various diameters by changing the circumferential distance between the mechanisms 68. This may be accomplished by adjusting the mechanisms radially on the platform means 60. Furthermore, as described above, the mechanisms 70, 72 and 74 and the transfer devices may be adjusted radially for accommodating can bodies of various diameters and it is obvious that suitable means may be provided for radially adjusting the various actuating ring cams and racks and radially slidable members operated thereby to adapt the apparatus for processing various sizes of can bodies.

From the above description it is seen that the present invention has provided a novel method and apparatus for processing can bodies and the like while the can body blanks and/or partially formed can bodies are continuously moving along a predetermined path of travel whereby to facilitate rapid and economical production. Furthermore, it is seen that such rapid and economical production is facilitated by providing a novel apparatus wherein the various processing tools perform their various functions while moving along a path of travel with the can bodies. It will also be appreciated that with the novel apparatus disclosed herein, considerable floor space may be saved while at the same time production may be increased. Furthermore, by the novel arrangement of the various processing tools disclosed above, it is seen that can body blanks may be formed and subjected to a series of processing steps without requiring storage of the blanks between various processing steps and without requiring the transfer of the blanks between separate machines as has heretofore been the practice. While the present invention has been disclosed and described with particular reference to can bodies, the application of certain features of the invention to the processing of other articles will readily become apparent.

Although the preferred embodiments of the present invention have been shown and described herein, it is obvious that many details may be changed without departing from the spirit and scope of the appended claims.

The invention is hereby claimed as follows:

1. An apparatus for processing can bodies comprising an elongated shaft, support means rotatably mounted on said shaft, a plurality of means disposed on and spaced around said support means for cutting an elongated strip of sheet material stock into a plurality of can body blanks, a second support means rotatably mounted on said shaft, a plurality of means disposed on and spaced around said second support means for forming said blanks into can bodies, a plurality of means movable with said support means for transferring blanks from said cutting means to said forming means, and means for continuously rotating said support means and for actuating said cutting means, said forming means and said transferring means in time with each other.

2. An apparatus for processing can bodies from an elongated strip of sheet material stock comprising a generally upstanding shaft, a plurality of superposed support means rotatably mounted on said shaft, means movable with and spaced around one of said support means for cutting said elongated strip of sheet material stock to a plurality of can body blanks, means movable with and spaced around another of said support means for forming said blanks into can bodies, means movable with said support means for transferring said blanks from the cutting means to the forming means, and means for actuating all of the aforementioned means in timed relationship.

3. An apparatus for processing can bodies from an elongated strip of sheet material stock comprising a shaft, support means rotatably mounted on said shaft, a plurality of die means disposed on and spaced around said support means for cutting said elongated strip of sheet material stock into a plurality of can body blanks and for forming can body side seam flanges on opposite ends of said blanks, another support means rotatably mounted on said shaft, a plurality of means disposed on and spaced around said second mentioned support means for forming said blanks into can bodies, each of said last mentioned forming means including an expandable horn, means for forming a blank around said horn and means for interlocking and hammer said side seam flanges, a plurality of means movable with said support means for transferring said blanks from said cutting and flange forming means to said body forming means, and means for continuously actuating all of the aforementioned means in timed relationship.

4. An apparatus as defined in claim 3 wherein said shaft is arranged in a generally upright position.

5. An apparatus as defined in claim 3 wherein said actuating means includes cam means fixed with respect to said support means for actuating said cutting and side seam flange forming means, said body forming means and said transferring means.

6. An apparatus for processing can bodies from an elongated strip of sheet material stock comprising means for applying a plurality of narrow bands of sealing material transversely to and spaced on said sheet material stock, a shaft adjacent said applying means, a support means rotatably mounted on said shaft, a plurality of means disposed on and spaced around said support means for cutting said strip of sheet material at said bands of sealing material to provide a plurality of can body blanks and for forming portions of the sheet material having said sealing material thereon into can body side seam flanges, a second support means rotatably mounted on said shaft, a plurality of means disposed on and spaced around said second support means for forming said blanks into can bodies having side seams with said sealing material disposed within said side seams, means movable with said support means for transferring said blanks from said cutting and side seam flange forming means to said body forming means, another support means rotatable around said shaft, means disposed on and spaced around said last mentioned support means for rendering said sealing material in the can body side seams effective to seal said side seams, means for transferring can bodies from said body forming means to said means for rendering the sealing material effective, and means for actuating all of the aforementioned means in timed relationship with each other.

7. An apparatus as defined in claim 6, which includes additional support means rotatably mounted on said shaft, a plurality of means carried by and spaced around said additional support means for providing end seam flanges on ends of said can bodies, and means for transferring can bodies to said end seam flanging means.

8. An apparatus as defined in claim 7, which includes means for transferring can bodies from said end seam flanging means to a desired point of discharge, said last named transfer means comprising a rotatable member, a plurality of can body holder members pivotally mounted on said rotatable member to rotate the can bodies from the positions in which they are received and reposition the can bodies for discharge, and means for actuating said holder members to and from can body receiving and discharging positions.

9. An apparatus for producing can bodies comprising a plurality of adjacently disposed support means mounted for movement around endless paths substantially in axial alignment and disposed in generally spaced apart parallel planes, means on one of said support means for forming can body blanks into cylindrical bodies, means on other of said support means for further processing cylindrical bodies, means movable around an endless path substantially axially aligned with and disposed between said forming and said processing means and movable with said support means for transferring partially processed can bodies between said forming means and said processing means, and means for continuously actuating said support means and said forming and processing means and said transferring means in predetermined timed relationship.

10. An apparatus for processing can bodies comprising a plurality of adjacently disposed support means mounted for rotation about a substantially common axis, means movable with one of said support means for forming blanks into substantially cylindrical bodies, means movable with other of said support means for further processing the cylindrical bodies, means movable around an endless path with and between said support means for transferring can bodies from said forming means to said processing means, means for continuously rotating said support means, and means for actuating said forming means and said processing means in timed relationship with each other and with the rotation of said support means.

11. An apparatus for producing can bodies comprising a plurality of superposed support means mounted for endless motion, means movable with one of said support means for forming blanks into substantially cylindrical bodies, means movable with other of said support means for further processing said cylindrical bodies, means movable around an endless path with said support means and between said support means for transferring partially processed cylindrical bodies between said forming means and said processing means, means for continuously moving said support, forming and processing means and said transferring means around said endless paths, and means for actuating said forming and processing means and said transferring means in time with each other and with the movement of said support means.

12. An apparatus for processing can bodies from sheet material stock moving along a predetermined path of travel comprising first and second adjacently disposed support means movable about substantially concentric endless paths of travel having portions extending along said first mentioned path of travel, means on said first support means and movable along said first mentioned path of travel for forming said sheet material stock into can bodies, means on said second support means and movable along a portion of said first path of travel for forming end seam flanges on ends of the can bodies, means movable with said support means for transferring bodies from the body forming means to the flange forming means, and means for actuating all of the aforesaid means in timed relationship.

13. An apparatus for processing can bodies from sheet material stock moving along a predetermined path of travel comprising first and second adjacently disposed support means movable about substantially concentric endless paths of travel having portions extending along portions of said first mentioned path of travel, means on said first support means and movable along said portion of the first mentioned path of travel for forming said sheet material stock into can bodies having side seams, means on said second support means and movable along a portion of said first mentioned path of travel for sealing said side seams, means movable with said support means for transferring can bodies from said body forming means to said side seam sealing means, and means for continuously operating all of the aforesaid means in predetermined timed relationship.

References Cited in the file of this patent
UNITED STATES PATENTS

| | | |
|---|---|---|
| 498,810 | Norton et al. | June 6, 1893 |
| 518,375 | Ranney | Apr. 17, 1894 |
| 526,925 | Johnson et al. | Oct. 2, 1894 |
| 554,027 | Johnson | Feb. 4, 1896 |
| 929,798 | Spain | Aug. 3, 1909 |
| 1,225,172 | Privett | May 8, 1917 |
| 1,929,339 | Troyer et al. | Oct. 3, 1933 |
| 2,142,235 | Burns | Jan. 3, 1939 |
| 2,177,104 | Gonser | Oct. 24, 1939 |
| 2,214,422 | Kronquest | Sept. 10, 1940 |
| 2,325,230 | Crane | July 27, 1943 |
| 2,444,463 | Nordquist | July 6, 1948 |
| 2,444,465 | Peters | July 6, 1948 |
| 2,528,860 | Clark | Nov. 7, 1950 |